United States Patent
McLean et al.

(10) Patent No.: US 9,686,214 B2
(45) Date of Patent: *Jun. 20, 2017

(54) STATUS AND TIME-BASED DELIVERY SERVICES FOR INSTANT MESSENGERS

(71) Applicant: International Business Machines Corporation, Armonk, NY (US)

(72) Inventors: James G. McLean, Fuquay-Varina, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,780

(22) Filed: Aug. 8, 2016

(65) Prior Publication Data

US 2016/0352662 A1   Dec. 1, 2016

Related U.S. Application Data

(63) Continuation of application No. 11/971,737, filed on Jan. 9, 2008, now Pat. No. 9,412,095.

(51) Int. Cl.
  *G06Q 10/10* (2012.01)
  *H04L 12/58* (2006.01)
  *H04L 29/08* (2006.01)

(52) U.S. Cl.
  CPC ......... *H04L 51/046* (2013.01); *G06Q 10/107* (2013.01); *G06Q 10/109* (2013.01); *H04L 12/581* (2013.01); *H04L 51/02* (2013.01); *H04L 51/04* (2013.01); *H04L 51/12* (2013.01); *H04L 51/18* (2013.01); *H04L 51/26* (2013.01); *H04L 67/24* (2013.01)

(58) Field of Classification Search
  CPC .... G06Q 10/107; G06Q 10/109; G06Q 10/10; H04L 12/581; H04L 51/04; H04L 51/02; H04L 51/12; H04L 51/18; H04L 51/26
  See application file for complete search history.

(56) References Cited

U.S. PATENT DOCUMENTS

| | | | |
|---|---|---|---|
| 6,301,609 B1 | 10/2001 | Aravamudan | |
| 6,691,162 B1 | 2/2004 | Wick | |
| 6,920,478 B2 | 7/2005 | Mendiola | |
| 6,988,128 B1 | 1/2006 | Alexander et al. | |
| 7,428,580 B2 | 9/2008 | Hullfish et al. | |

(Continued)

FOREIGN PATENT DOCUMENTS

WO   WO 2006107181   10/2006

*Primary Examiner* — Patrice Winder
*Assistant Examiner* — Angela Widhalm De Rodri
(74) *Attorney, Agent, or Firm* — Steven M. Greenberg, Esq.; CRGO LAW

(57) ABSTRACT

Embodiments of the present invention address deficiencies of the art in respect to unattended status and time-based messaging in an instant messaging (IM) environment and provide a method, system and computer program product for unattended status and time-based messaging in an instant messaging (IM) environment. In an embodiment of the invention, a method for unattended status and time-based messaging in an instant messaging (IM) environment can be provided. The method can include receiving a request from an IM user to queue an unattended status and time-based message, retrieving a recovery trigger for the unattended status and time-based message, and assigning the unattended status and time-based message to a message queue.

14 Claims, 2 Drawing Sheets

(56) References Cited

U.S. PATENT DOCUMENTS

| | | |
|---|---|---|
| 7,461,378 B2 | 12/2008 | Beyda |
| 7,519,672 B2 | 4/2009 | Boss |
| 7,668,918 B2 | 2/2010 | Diddee |
| 7,698,327 B2 | 4/2010 | Kapur |
| 7,747,685 B2 | 6/2010 | Chen |
| 7,752,268 B2 | 7/2010 | Shah |
| 7,895,314 B1 | 2/2011 | Russell |
| 8,086,672 B2 | 12/2011 | Horvitz |
| 8,122,088 B2 | 2/2012 | Banatwala |
| 8,213,425 B2 | 7/2012 | Zhao |
| 8,631,076 B1 | 1/2014 | Auerbach |
| 8,856,236 B2 | 10/2014 | Moore |
| 2002/0087649 A1 | 7/2002 | Horvitz |
| 2003/0182391 A1 | 9/2003 | Leber |
| 2005/0055412 A1 | 3/2005 | Kaminsky et al. |
| 2006/0048061 A1 | 3/2006 | Forlenza et al. |
| 2006/0168204 A1 | 7/2006 | Appelman et al. |
| 2006/0210034 A1 | 9/2006 | Beadle et al. |
| 2007/0016640 A1 | 1/2007 | Auvray et al. |
| 2007/0016643 A1 | 1/2007 | Boss |
| 2007/0168863 A1 | 7/2007 | Blattner |
| 2008/0214161 A1 | 9/2008 | Jakl |
| 2009/0138599 A1 | 5/2009 | Allin |

STATUS AND TIME-BASED DELIVERY SERVICES FOR INSTANT MESSENGERS

CROSS-REFERENCE TO RELATED APPLICATIONS

This application is a Continuation of U.S. patent application Ser. No. 11/971,737, filed on Jan. 9, 2008, the entirety of which is herein incorporated by reference.

BACKGROUND OF THE INVENTION

Field of the Invention

The present invention relates to computer communication systems and more particularly to a status and time-based delivery service for instant messengers.

Description of the Related Art

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet. E-mail, which allows a user to transmit a message to another user, is one of the more popular uses of the Internet, and its use continues to increase.

Another application that continues to increase in popularity is instant messaging (IM). IM systems allow two or more users on computer systems such as PCs or mobile computing devices to exchange messages in real-time (or near real-time). IM systems allow users to maintain a list of other users, called a buddy or contact list, with whom they wish to interact. Using the IM system, a user can send an instant message to any person on their contact list as long as that person is on-line. IM systems typically provide current status information about users on the contact list, telling the contact list owner whether each user on the list is on-line or off-line so that they will know with whom they may interact. This feature is often called presence management. Sending a message to an on-line user opens up a window where each user may type messages that the other user may see, allowing for an electronic "conversation".

The popularity of IM systems is partially based on the immediacy of IM systems, particularly when compared to e-mail. Unlike e-mail, this immediacy requires both parties in an IM exchange to be on-line at the same time. The immediacy of IM systems allows for interactive, back-and-forth exchanges of information without having to perform multiple steps to read, reply, and send a reply e-mail.

IM systems typically provide a choice of different status configurations indicating a user's current status. These status indications will be seen by other users from their own IM programs. If a user is active and available for instant messaging, their status will indicate "active". If a user is active on the system and desires not to receive instant messages, they may also select a "do not disturb" status which will tell other users not to transmit instant messages even though the user is on-line. If a user is logged in to the system but will be unable to respond to instant messages, such as when they are in a meeting, they may select an "away" status.

Oftentimes, the desired contact of a user will appear as unavailable, e.g., "do not disturb" and "in a meeting". In such situations, the user finds he is constantly checking his contact list to determine when the desired contact becomes available, or must simply risk interrupting the contact by sending a message despite "away" or "unavailable" status. Consequently, the user must waste time by having to constantly check status for the desired contact, waste time waiting to be notified that the desired contact has returned to her computer or potentially annoy the desired contact by sending an IM message.

BRIEF SUMMARY OF THE INVENTION

Embodiments of the present invention address deficiencies of the art in respect to status and time-based unattended messages in an instant messaging (IM) environment and provide a novel and non-obvious method, system and computer program product for unattended status and time-based messages in an IM environment. In an embodiment of the invention, a method for unattended status and time-based messaging can be provided. The method can include receiving a request from an IM user to queue an unattended status and time-based message, retrieving a recovery trigger for the unattended status and time-based message, and assigning the unattended status and time-based message to a message queue.

In one aspect of the embodiment, the method further can include monitoring IM environment communications for transmission of recovery triggers, detecting a recovery trigger in an IM communication, matching the detected recovery trigger from the IM communication to the recovery trigger of the queued unattended status and time-based message, and transmitting the queued unattended status and time-based message to a designated recipient. In another aspect of the embodiment, matching the detected recovery trigger from the IM communication to the recovery trigger of the queued unattended status and time-based message can include determining if the recovery trigger is a conditional recovery trigger based on recipient IM status and selecting the queued unattended status and time-based message that fulfills the status conditions of the conditional recovery trigger.

In another embodiment of the invention, an unattended status and time-based messaging system can be provided. The system can include an instant messaging client executing in a host computing platform, and status and time-based messaging logic coupled to the instant messaging client. The status and time-based messaging logic can include program code enabled to generate requests to queue unattended status and time-based messages, and generate recovery triggers for assigning and retrieving unattended status and time-based messages from a message queue.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for unattended status and time-based messaging in an instant messaging (IM) environment. In accordance with an embodiment of the present invention, a request from an IM user to queue an unattended status and time-based message can be received by an IM system manager and analyzed to identify recovery triggers. The request to queue the unattended status and time-based message is typically the result of a desired recipient being unavailable for an IM session. A recovery trigger can be retrieved from the unattended status and time-based message and stored with the unattended message in a message queue. The IM environment communications can be monitored to detect subsequent transmissions of recovery triggers. The recovery triggers can be conditional recovery triggers and an analysis of the type of condition, e.g., time-based or status-based can be performed in order to select the appropriate unattended message from a message queue for transmission to a desired recipient.

Figure 1:
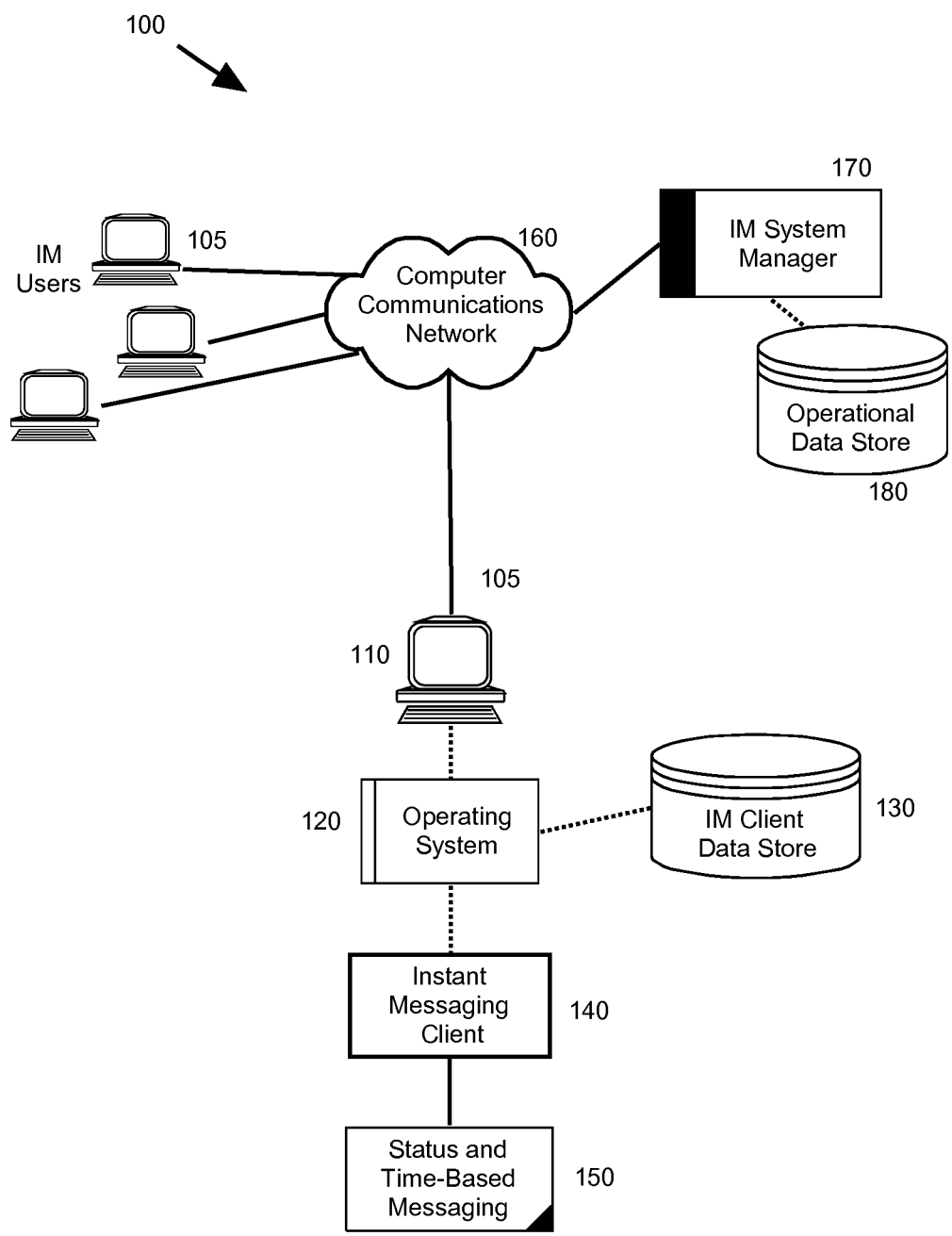
FIG. 1 is a schematic illustration of an instant messaging (IM) system configured for unattended status and time-based messaging in an IM environment; and, FIG. 2 is a flow chart illustrating a process for unattended status and time-based messaging in an IM environment.

In illustration, FIG. 1 schematically depicts an IM system 100 configured for unattended status and time-based messaging. The system can include a plurality of computer systems 105 in communication with a computer communications network 160. Each computer system 105 can include a host-computing platform 110 supporting an operating system 120. The operating system 120 in turn can host an instant messaging client 140 configured to provide instant messaging communications with IM system manager 170 over network 160. IM system 100 also can include operational data store 180 in communication with IM system manager 170 and/or network 160. Operational data store 180 can provide storage for any type of information for the IM system manager 170. Optionally, IM system 100 also can include IM client data store 130 in communication with operating system 120, IM system manager 170 and/or network 160. Optional IM client data store 130 can provide storage for any type of information related to the IM users 105. For example, optional IM client data store 130 can provide storage for calendaring information of the IM users 105.

In IM system 100, the computer systems 105, IM system manager 170, and operational data store 180 may be located at the same location, such as in the same building or computer lab, or could be remote. IM system manager 170 can facilitates instant messaging between IM clients 140 on different computer systems 105 by transmitting and receiving information, such as the identification, status and network address of the IM clients 140 and/or computer systems 105. All of this information can be stored in operational data store 180 and/or IM client data store 130.

Notably, status and time-based messaging logic 150 can be coupled to the IM client 140 and the optional IM client data store 130. The status and time-based messaging logic 150 can include program code enabled to compose a request to queue unattended messages, which in turn can be received and processed by the IM system manager 170 to determine appropriate queuing for the unattended messages. More specifically, the program code of the status and time-based messaging logic 150 can be enabled to generate conditional recovery triggers for the status and time-based unattended messages which in turn can be used to determine which unattended message should be recovered from the IM messaging queue for delivery to desired contact.

In one embodiment, a user on a computer system 105 can open an IM client 140 so that it is executing on the computer system 105. The IM client 140 then attempts to connect to the IM system manager 170 using network 160. Using the IM client 140, the user then typically enters a user name (or other identification) to log in to the IM system manager 170. In this embodiment, the IM client 140 then transmits connection information (such as the IP address and port number assigned to IM client 140 on computer system 105, as well as a contact list, etc.) of the computer system 105 on which the IM client 140 is located. The IM system manager 170 may then determine if any users from the contact list are currently logged in (e.g., their IM client 140 is active and running), after which it will transmit status information (as well as IP address and port number) for users on the contact list back to the initial IM client 140, as well as transmitting status information, e.g., "active", for the initial IM client 140 to the users in the contact list. Status information for each user may be stored at the IM system manager 104, operational data store 180 and/or IM client data store 130.

Figure 2:
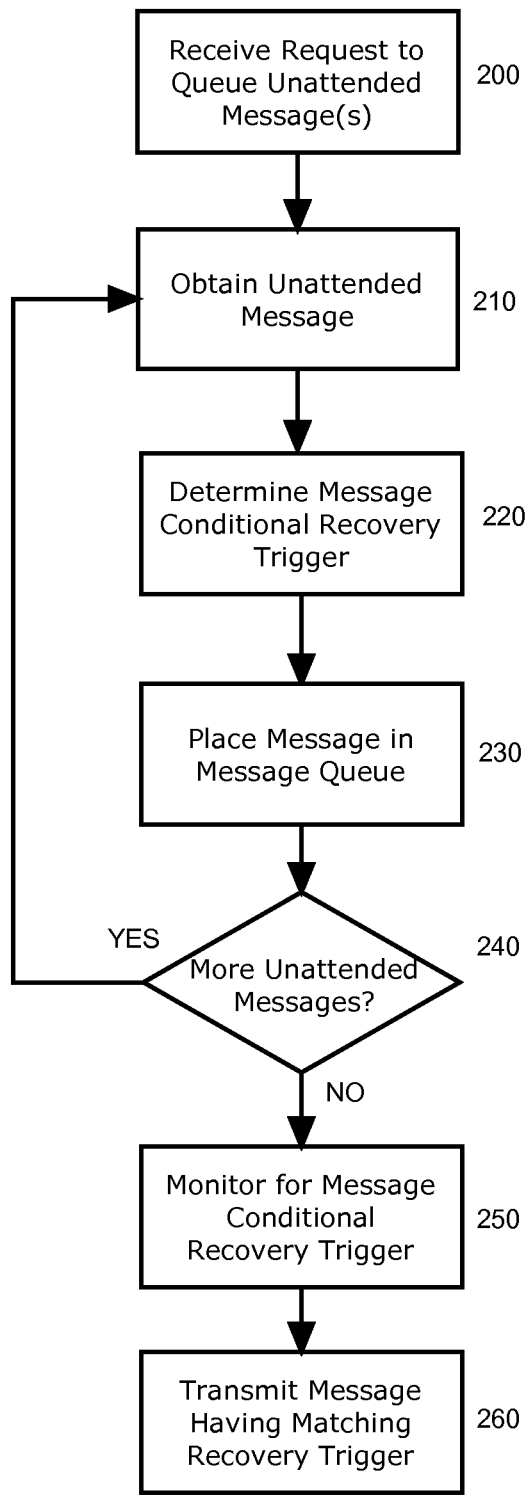

In yet further illustration of the operation of the status and time-based messaging logic 150, FIG. 2 is a flow chart illustrating a process for status and time-based messaging in an IM system. Beginning in block 205, a request to queue one or more unattended status and time-based messages can be received by the IM system manager 170. In block 210, the corresponding one or more unattended status and time-based messages can be selected and in block 215 conditional recovery triggers for each unattended message are evaluated. In block 220, based on the evaluated conditional recovery triggers, the one or more unattended messages can be place in an unattended message queue.

In decision block 225, if there are additional unattended messages to be processed, the process can repeat through block 210. Otherwise, when no further unattended messages remain to be processed, in block 230, the IM system manager 170 can monitor the IM system 100 for any of the conditional recovery triggers that were processed and correspond to an unattended message stored in the unattended message queue. For example, Adam (sender) wants to send a message to Bob (recipient) to let him know where he is going to be, but Bob is currently away from his computer. This presents a problem because by the time Bob gets back, Adam may be somewhere else and unable to update Bob. As such, Adam sets it up so that if Bob recovers soon, he will receive the message "I went to lunch at the mall"; however, if Bob recovers after 1 pm, Bob will instead receive the message "I went to the dentist" and so on for as many messages Adam would like to register. In this embodiment, unattended message recovery triggers are based on the time that Bob (recipient) recovers, or is determine to be "active" by the IM system 100.

Consequently, in block 330, the IM system manager 170 can detect the change of status for the desired recipient, e.g., Bob, observe which recovery trigger occurred and match that recovery trigger to the queued unattended message having the same recovery trigger. In block 235, the queued unattended message having the same recovery trigger can be transmitted to the desired recipient.

In another embodiment, a sender, e.g., Adam, could set up his Instant Messenger to pull records from his calendar database and select an option, e.g., "Inform User of My Location on Recovery", to automatically forward data from the sender's calendar relative to that sender's scheduled location to the desired recipient upon the desired recipient's recovery to the IM system 100.

In another embodiment, one or more of the queued or generated unattended messages may be a null message (i.e., no message at all). In this embodiment, a time-based expiration or pre-emption of content-bearing messages is created. For example, a sender, e.g., Bob, can create a message to a desired recipient, e.g., Adam, that consists of the content "call me" if Adam recovers prior to 9 PM, however, no message is sent if Adam recovers after 9 PM.

In another embodiment, instead of the IM system manager 170 receiving the unattended message, placing it in the unattended message queue and monitoring the IM system for matching recovery triggers, the sender's IM client 140 can receive the relevant message data and monitor the indicated recipient until the recovery trigger, such as the status condition is fulfilled. In yet another embodiment, the message policy could be located on an intermediate server, which could perform the receiving, storing, monitoring and retrieving functions. In this embodiment, the sending IM client 140 could then shut off, which would be more convenient for end users who might be mobile.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for unattended status and time-based messaging in an instant messaging (IM) environment, the method comprising:
   receiving a request from an IM user to queue a plurality of unattended status and time-based messages to be sent from the IM user to a designated recipient at a later time according to a time condition;
   retrieving a plurality of recovery triggers, respectively from the plurality of unattended status and time-based messages, the triggers specifying a time condition responsive to which one of the unattended status and time-based messages is to be transmitted to the designated recipient;
   transferring the plurality of unattended status and time-based messages to a message queue along with the triggers;
   subsequently detecting a recovery trigger in an IM communication in connection with a designated recipient of one of the queued unattended status and time-based messages;
   matching the detected recovery trigger from the IM communication to one of the plurality of recovery triggers of the queued unattended status and time-based messages based upon a time condition associated with the detected recovery trigger; and,
   selecting the queued unattended status and time-based message associated with the one of the plurality of recovery triggers that fulfills the time condition and transmitting the selected queued unattended status and time-based message to the designated recipient.

2. The method of claim 1, further comprising, upon detecting a change in status of the desired recipient, automatically forwarding scheduled location data from a calendaring application of the IM user to the desired recipient.

3. A computer program product comprising a computer usable storage memory device having stored thereon computer usable program code for unattended status and time-based messaging in an instant messaging (IM) environment, the computer usable program code, when executed on a computer device, causing the computer device to perform the operations of:
   receiving a request from an IM user to queue a plurality of unattended status and time-based messages to be sent from the IM user to a designated recipient at a later time according to a time condition;
   retrieving a plurality of recovery triggers, respectively from the plurality of unattended status and time-based messages, the triggers specifying a time condition responsive to which one of the unattended status and time-based messages is to be transmitted to the designated recipient;
   transferring the plurality of unattended status and time-based messages to a message queue along with the triggers;
   subsequently detecting a recovery trigger in an IM communication in connection with a designated recipient of one of the queued unattended status and time-based messages;
   matching the detected recovery trigger from the IM communication to one of the plurality of recovery triggers of the queued unattended status and time-based messages based upon a time condition associated with the detected recovery trigger; and, selecting the queued unattended status and time-based message associated with the one of the plurality of recovery triggers that fulfills the time condition and transmitting the selected queued unattended status and time-based message to the designated recipient.

4. The computer program product of claim 3, wherein the computer usable program code, when executed on the computer device, causes the computer device to further perform the operations of, upon detecting a change in status of a desired recipient, automatically forwarding scheduled location data from a calendaring application of the IM user to the desired recipient.

5. A computer hardware instant messaging (IM) system manager for unattended status and time-based messaging in an instant messaging (IM) environment, comprising:

an operational data store including a message queue; and
a processor configured to
receive a request from an IM user to queue, in the message queue, a plurality of unattended status and time-based messages to be sent from the IM user to a designated recipient at a later time according to a time condition;
retrieving a plurality of recovery triggers, respectively, from the plurality unattended status and time-based messages, the triggers specifying a time condition responsive to which one of the unattended status and time-based messages is to be transmitted to the designated recipient;
transferring the plurality of unattended status and time-based messages to the message queue along with the triggers;
subsequently detecting a recovery trigger in an IM communication in connection with a designated recipient of one of the queued unattended status and time-based messages;
matching the detected recovery trigger from the IM communication to one of the plurality of recovery triggers of the queued unattended status and time-based messages based upon a time condition associated with the detected recovery trigger; and
selecting the queued unattended status and time-based message associated with the one of the plurality of recovery triggers that fulfills the time condition and transmitting the selected queued unattended status and time-based message to the designated recipient.

6. The method of claim 1, wherein only a single one of the plurality of the status and time-based messages is selected.

7. The method of claim 1, wherein less than all of the plurality of queued unattended status and time-based message is selected.

8. The method of claim 1, wherein each of the plurality of recovery triggers is specific to a single status time-based message of the plurality of unattended status and time-based messages.

9. The computer program product of claim 3, wherein only a single one of the plurality of the status and time-based messages is selected.

10. The computer program product of claim 3, wherein less than all of the plurality of queued unattended status and time-based message is selected.

11. The computer program product of claim 3, wherein each of the plurality of recovery triggers is specific to a single status time-based message of the plurality of unattended status and time-based messages.

12. The computer hardware instant messaging system manager of claim 5, wherein only a single one of the plurality of the status and time-based messages is selected.

13. The computer hardware instant messaging system manager of claim 5, wherein less than all of the plurality of queued unattended status and time-based message is selected.

14. The computer hardware instant messaging system manager of claim 5, wherein each of the plurality of recovery triggers is specific to a single status time-based message of the plurality of unattended status and time-based messages.

* * * * *